United States Patent
Danmayr et al.

(10) Patent No.: US 9,929,673 B2
(45) Date of Patent: Mar. 27, 2018

(54) METHOD FOR FEEDING ENERGY FROM PHOTOVOLTAIC MODULES OF A PHOTOVOLTAIC SYSTEM AND INVERTER DESIGNED FOR EXECUTING THIS METHOD

(71) Applicant: FRONIUS INTERNATIONAL GMBH, Pettenbach (AT)

(72) Inventors: Joachim Danmayr, Nussbach (AT); Johannes Starzinger, Schoerfling (AT); Julian Landauer, Kremsmuenster (AT)

(73) Assignee: Fronius International GmbH, Pettenbach (AT)

( * ) Notice: Subject to any disclaimer, the term of this patent is extended or adjusted under 35 U.S.C. 154(b) by 388 days.

(21) Appl. No.: 14/685,723

(22) Filed: Apr. 14, 2015

(65) Prior Publication Data
US 2015/0295512 A1 Oct. 15, 2015

(30) Foreign Application Priority Data
Apr. 15, 2014 (AT) .................................. 50284/2014

(51) Int. Cl.
*H02J 1/10* (2006.01)
*H02M 7/44* (2006.01)
(Continued)

(52) U.S. Cl.
CPC ............... *H02M 7/44* (2013.01); *H02M 1/36* (2013.01); *H02M 3/00* (2013.01); *H02M 2001/007* (2013.01); *Y02E 10/56* (2013.01)

(58) Field of Classification Search
CPC ............ H02M 7/44; H02M 1/36; H02M 3/00; H02M 2001/007; Y02E 10/56
(Continued)

(56) References Cited

U.S. PATENT DOCUMENTS 8,194,375 B2   6/2012   Said El-Barbari et al.
8,354,820 B2   1/2013   Liu
(Continued)

FOREIGN PATENT DOCUMENTS

CN   101834450 A   9/2010
CN   101939660 A   1/2011
(Continued)

OTHER PUBLICATIONS

Austrian Office Action dated Mar. 31, 2015 in Austrian Application No. A 50284/2014 with English translation of the relevant parts.
(Continued)

*Primary Examiner* — Thomas Skibinski
(74) *Attorney, Agent, or Firm* — Collard & Roe, P.C.

(57) ABSTRACT

A method for feeding energy from photovoltaic modules (2) of a photovoltaic system (1) into a supply grid (5), or to a load, converts the DC voltage ($U_{DC}$) generated by the photovoltaic modules (2) in an inverter (3) with an intermediate circuit (7) with a capacitor ($C_{ZW}$) and with a DC/AC-converter (8) into an AC voltage ($U_{AC}$), and in a feed-in mode of operation the inverter (3) is connected via a switching device (4) to the supply grid (5), or to the load, together with an inverter (3) for executing the method. For conservation of the switching device (4) the input power ($P_e$) of the photovoltaic modules (2) is determined in a test procedure, and the switching device (4) of the inverter (3) is activated if the input power ($P_e$) of the photovoltaic modules (2) as determined is greater than or equal to a specified minimum input power ($P_{e,min}$).

8 Claims, 3 Drawing Sheets

(51) Int. Cl.
*H02M 1/36* (2007.01)
*H02M 3/00* (2006.01)
*H02M 1/00* (2006.01)

(58) Field of Classification Search
USPC .............. 307/52, 80, 85, 86, 63, 71, 77, 78;
327/509, 514, 515; 363/131, 132, 17, 16,
363/15; 323/304, 311, 312; 320/136,
320/166
See application file for complete search history.

(56) References Cited

U.S. PATENT DOCUMENTS

| | | |
|---|---|---|
| 8,482,936 B2 | 7/2013 | Falk et al. |
| 8,624,561 B1 | 1/2014 | Slavin |
| 8,779,630 B2 | 7/2014 | Prior et al. |
| 2011/0032099 A1 | 2/2011 | Giesler |
| 2011/0148361 A1 | 6/2011 | Yokotani |
| 2013/0127435 A1 | 5/2013 | Chen |
| 2013/0250641 A1 | 9/2013 | Falk |

FOREIGN PATENT DOCUMENTS

| | | | |
|---|---|---|---|
| CN | 102130467 A | 7/2011 | |
| DE | 10 2007 032 980 A1 | 7/2008 | |
| DE | 10 2010 060 633 B3 | 4/2012 | |
| EP | 2 242 160 B1 | 2/2012 | |
| EP | 2 566 031 A1 | 3/2013 | |
| JP | 2009-247184 A | 10/2009 | |
| JP | 2011/135657 A1 | 7/2011 | |
| JP | EP 2566031 A1 * | 3/2013 | .............. H02M 1/36 |
| WO | 2013/105008 A2 | 7/2013 | |

OTHER PUBLICATIONS

Japanese Office Action in JP 2015-082276, with English translation, Apr. 19, 2016.
Chinese Office Action in CN 201510175797.3, dated Nov. 1, 2016, with English translation.

\* cited by examiner

METHOD FOR FEEDING ENERGY FROM PHOTOVOLTAIC MODULES OF A PHOTOVOLTAIC SYSTEM AND INVERTER DESIGNED FOR EXECUTING THIS METHOD

CROSS REFERENCE TO RELATED APPLICATIONS

Applicant claims priority under 35 U.S.C. § 119 of Austrian Application No. A 50284/2014 filed Apr. 15, 2014, the disclosure of which is incorporated by reference.

BACKGROUND OF THE INVENTION

1. Field of the Invention

The invention concerns a method for feeding energy from photovoltaic modules of a photovoltaic system into a supply grid, or to a load, wherein the DC voltage generated by the photovoltaic modules is converted in an inverter with an intermediate circuit with a capacitor and with a DC/AC-converter into an AC voltage, and in a feed-in mode of operation the inverter is connected via a switching device to the supply grid, or to the load.

The invention furthermore concerns an inverter for converting the DC voltage generated by photovoltaic modules into an AC voltage for feeding into a supply grid, or to a load, with a control device, an intermediate circuit with a capacitor, a DC/AC-converter, and a switching device for connecting the output to the supply grid, or to the load, in a feed-in mode of operation, which is designed for executing the above method.

The present invention relates both to grid-connected photovoltaic systems, in which the electrical energy generated by the photovoltaic modules is fed into a supply grid, and also relates to so-called stand-alone inverters in which the energy delivered from the photovoltaic modules is used for a load, or for charging a battery.

2. Description of the Related Art

Methods and devices for connecting a photovoltaic system with a supply grid, or a load, have become of known art from, for example, DE 10 2010 060 633 B3 or EP 2 242 160 B1. In these, before the activation of the switching device of the inverter the input voltage of the inverter is determined. If the input voltage reaches a defined threshold value, the inverter initiates a switching-on procedure, in which the inverter, by activation of the switching device, is connected with the supply grid, or the load. The feed-in mode of operation, or the supply mode of operation, is then initiated at an operating point at which the maximum power is achieved (MPP: maximum power point). If, however, the photovoltaic system cannot deliver this input power, the inverter cannot maintain the feed-in mode of operation, or the supply mode of operation, and it deactivates the switching device such that the inverter is once again disconnected from the supply grid, or the load. This procedure is repeated until a feed-in mode of operation is possible, wherein the repetition takes place at relatively short intervals, so that the feed-in mode of operation can be executed as soon as possible after the conditions have been achieved. What is disadvantageous here is that the result is a high number of switching cycles, as a result of which the service life of the switching device is correspondingly reduced.

SUMMARY OF THE INVENTION

The object of the present invention therefore consists in the creation of an above-cited method and device, by means of which the above disadvantage can be eliminated, or at least reduced, and the feed-in mode of operation is enabled as a result of only one activation of the switching device.

The object of the invention is achieved by means of an above-cited method, wherein before the connection of the inverter to the supply grid, or the load, the input power of the photovoltaic modules is determined in a test procedure, and the switching device of the inverter is activated if the input power of the photovoltaic modules as determined is greater than or equal to a specified minimum input power. In accordance with the invention a check is therefore made before connecting the inverter to the supply grid, or the load, as to whether the photovoltaic modules can deliver the necessary minimum input power, before an activation of the switching device takes place and the feed-in mode of operation is initiated. By this means the number of switching cycles of the switching device of the inverter can be minimized, as a result of which the service life of the switching device, and thus of the inverter, can be lengthened. As a result of the lower number of switching cycles of the switching device the demand placed on the switching device is also reduced, so that more cost-effective switching devices can be utilized. Similarly, as a result of the minimisation of the activation of the switching device of the inverter the operating hours of the inverter are reduced, as a result of which the power consumption of the inverter itself can be held at a minimum. No additional hardware is required for the execution of the inventive method, rather the method can ideally be rapidly and simply implemented by appropriate programming of the control device of the inverter of the photovoltaic system. In the case of stand-alone operation the inventive method is similarly advantageous, since the connected load can be operated reliably after the activation of the switching device.

In accordance with a first variant of the method the input power of the photovoltaic modules is determined, in that the open circuit voltage of the photovoltaic modules is measured and from this value a test operating point with a test voltage and a test current is calculated, and with a test procedure a DC/DC-converter of the inverter is controlled to the test current, and the DC voltage of the photovoltaic modules is measured, and the switching device of the inverter is then activated if the DC voltage of the photovoltaic modules is greater than or equal to the test voltage, wherein during the test procedure the energy from the photovoltaic modules is stored in the capacitor of the intermediate circuit. In this solution therefore a notional test operating point is determined from the measured open circuit voltage of the photovoltaic modules, and by control of the DC/DC-converter a check is made as to whether this notional operating point can be achieved, which is the case if the input power of the photovoltaic modules is sufficient.

The test current of the test operating point is determined in accordance with a feature of the inventive method by the division of the specified minimum input power by the open circuit voltage reduced by a factor. From experience the maximum power of the photovoltaic modules lies just under the open circuit voltage.

For most of the photovoltaic modules of known art the point on the current-voltage diagram of the photovoltaic modules at which the greatest power can be extracted lies at the so-called MPP (maximum power point) at a voltage of 70% to 90%, preferably 80%, of the open circuit voltage, which is synonymous with a factor of between 70% and 90%, preferably of 80%.

In a second variant of the inventive method the input power of the photovoltaic modules is determined, in that during the test procedure the capacitor of the intermediate circuit of the inverter is charged with the energy from the photovoltaic modules, and the time required to achieve a specified fraction of the open circuit voltage of the photovoltaic modules is measured, and the switching device of the inverter is activated if the test time is less than or equal to a specified critical time.

In order to ensure that the capacitor of the intermediate circuit of the inverter is fully discharged before execution of the test procedure, the capacitor is discharged before the test procedure.

The capacitor of the intermediate circuit of the inverter can be discharged via the DC/AC-converter of the inverter, via discharge resistances, or by means of a self-discharge of the capacitor.

The test procedure is preferably executed over a defined period of time, and preferably cyclically, until the switching device of the inverter is activated and the feed-in mode of operation is executed. The cycle time can be, for example, 30 seconds.

The object of the invention is also achieved by means of an above-cited inverter, the control device of which is designed for executing the above-described method.

BRIEF DESCRIPTION OF THE DRAWINGS

The invention is described in more detail on the basis of the attached figures. In the drawings.

DETAILED DESCRIPTION OF PREFERRED EMBODIMENTS

Figure 1:
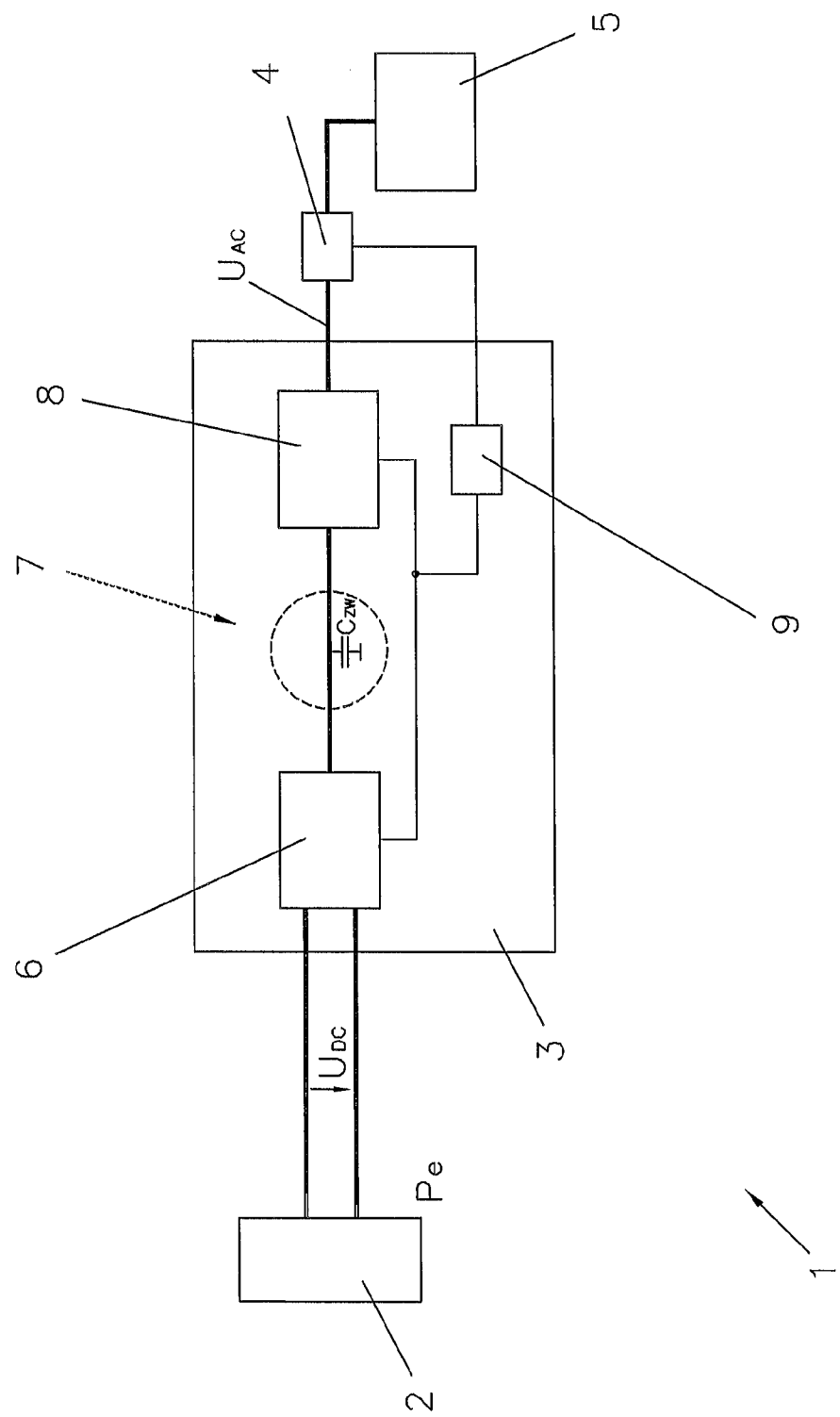
FIG. 1 shows a schematic block diagram of a photovoltaic system with a grid-connected inverter.

FIG. 1 shows a schematic block diagram of a photovoltaic system 1, which includes at least one photovoltaic module 2 as a DC voltage source, which photovoltaic module delivers a DC voltage $U_{DC}$. The photovoltaic system 1 further includes an inverter 3 and a switching device 4, via which the AC voltage $U_{AC}$ generated by the inverter 3 can be connected to a supply grid 5, or to a load (not represented). The inverter 3 can have a DC/DC-converter 6, an intermediate circuit 7 and a DC/AC-converter 8, and a control device 9, which control device 9 can also activate and deactivate the switching device 4.

In accordance with the invention the switching device 4 is activated only if the input power $P_e$ of the photovoltaic modules 2 achieves a specified minimum input power $P_{e,min}$. In this feed-in mode of operation, with the switching device 4 activated, the energy delivered by the photovoltaic module 2 is fed into the supply grid 5, or is used for supplying the load. For the feed-in mode of operation it should accordingly be possible to deliver sufficient energy from the photovoltaic module 2 such that the switching device ideally only needs to be activated one single time. Sufficient input power $P_e$ is available if the inverter 3 can be operated at the feed-in operating point, the so-called MPP (maximum power point), and the internal losses of the inverter 3 are covered by the input power $P_e$ of the photovoltaic modules 2. The internal losses of the inverter are usually to be found in the double-digit range of watts. In order to ensure a reliable feed-in mode of operation with preferably one single switching cycle of the switching device 4, a test procedure is executed on the photovoltaic module 2 with the switching device 4 deactivated, by means of which procedure the input power $P_e$ of the photovoltaic modules 2 is determined. The method is suitable both for inverters with transformers, and also for inverters 3 without transformers.

Figure 2:
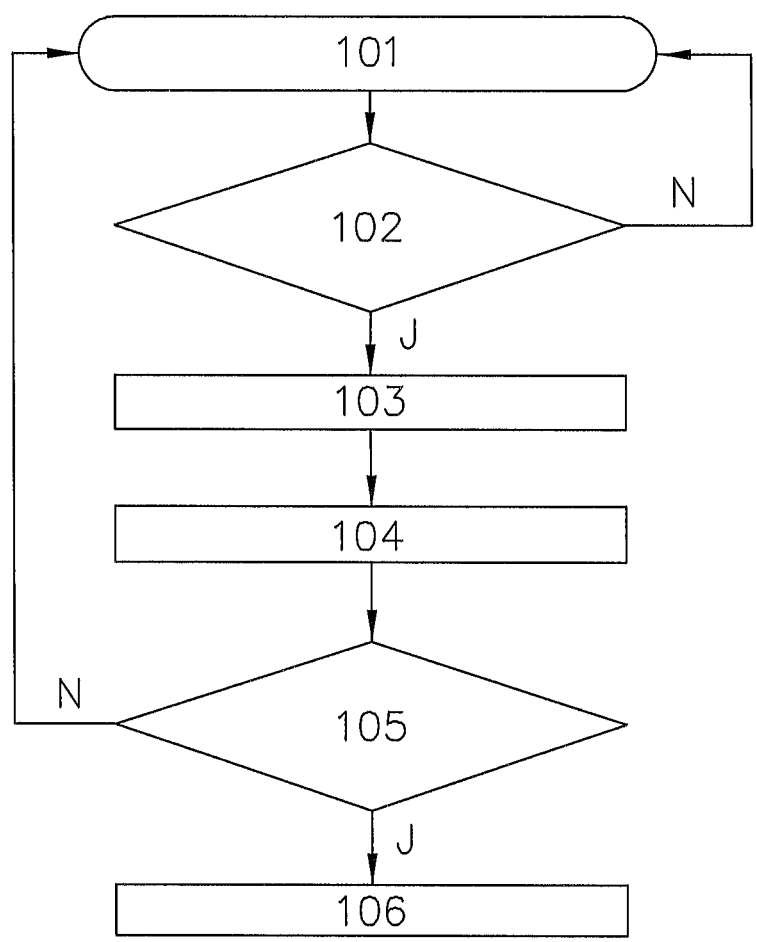
FIG. 2 shows a flow diagram to illustrate a first variant of the inventive method.
Figure 3:
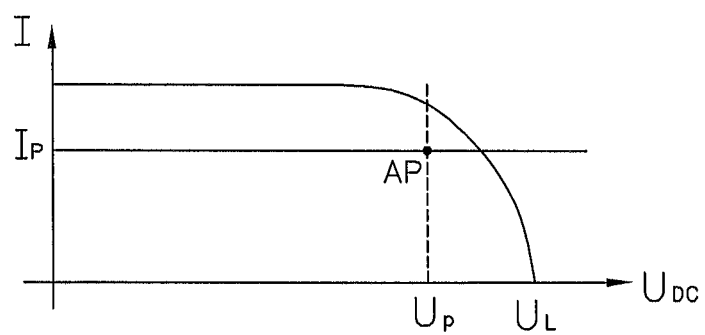
FIGS. 3 and 4 show current/voltage diagrams to illustrate a first inventive method.
Figure 4:
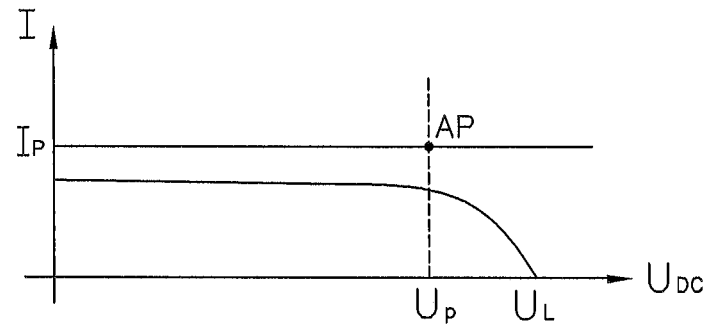

A first variant of the method is now described with the aid of FIGS. 2 to 4. FIG. 2 shows a flow diagram to illustrate this variant of the method. In accordance with block 101 a particular minimum input power $P_{e,min}$ of the photovoltaic modules 2 is established, and the open circuit voltage $U_{LL}$ of the photovoltaic modules 2 is measured. In accordance with the query 102 it is determined as to whether the open circuit voltage $U_L$ achieves a defined threshold value. If the open circuit voltage $U_L$ lies below the threshold value, a return is made back to block 101. If the open circuit voltage $U_L$ achieves the threshold value the method continues on to block 103, in which the notional test operating point AP is established with a test voltage $U_P$ and a test current $I_P$. For example, the test voltage $U_P$ is defined as a fraction of the open circuit voltage $U_L$, in accordance with $U_P = k \cdot U_L$, wherein the factor k preferably lies between 70% and 90%, in particular at 80%. The MPP often lies at 80% of the open circuit voltage $U_L$, although this is dependent on the type of photovoltaic modules 2. The test current $I_P$ is determined by the division of the minimum input power $P_{e,min}$ by the test voltage $U_P$. In this manner the values for the test voltage $U_P$ and the test current $I_P$ at the test operating point AP are calculated. In accordance with block 104 the DC/DC-converter 6 of the inverter 3 is controlled to this test current $I_P$ as determined, and the input voltage of the photovoltaic modules 2 is measured. In accordance with the query 105 a check is now made as to whether the test operating point AP can be achieved, i.e. as to whether the input power $P_e$ of the photovoltaic modules 2 is sufficient in order to be able to deliver the test voltage $U_P$ and the test current $I_P$ at the operating point AP. In the event of confirmation the switching device 4 is activated in accordance with block 106 and the inverter 3 is to be found in the feed-in mode of operation. If the input voltage of the photovoltaic modules 2 breaks down during the test of the control of the DC/DC-converter 6 to the test current $I_P$, that is to say, if the test operating point AP cannot be achieved, a return is made back to block 101 of the method.

FIGS. 3 and 4 show current/voltage diagrams to illustrate the method in FIG. 2. In the first case in accordance with FIG. 3 the test operating point AP can be achieved, that is to say, the input power $P_e$ of the photovoltaic modules 2 is sufficient to cover the losses of the inverter 3, and an activation of the switching device 4 can take place. In FIG. 4 the test operating point AP cannot be achieved, that is to say, the input power $P_e$ of the photovoltaic modules 2 is insufficient to cover the losses of the inverter 3, and no activation of the switching device 4 takes place, and thus no switch to the feed-in mode of operation.

In the test procedure, the DC/DC-converter 6 of the inverter 3 therefore serves as a load for the photovoltaic modules 2. For this purpose the switching elements of the DC/DC-converter 6 are appropriately controlled by the control device 9 of the inverter 3. The energy is stored in the intermediate circuit 7 of the inverter 3. The DC/DC-converter 6 therefore controls the current to the current $I_P$ as determined for the test operating point AP, and the voltage $U_{DC}$ and the current of the photovoltaic modules 2 are measured. During the current control the measured voltage should not drop below the test voltage $U_P$; this check is made by means of a comparison of the measured voltage $U_{DC}$ with the test voltage $U_P$. If the measured voltage does not drop below the test voltage $U_P$, the check on the input power $P_e$ of the photovoltaic modules 2 is successful, the switching device 4 can be activated, and the feed-in mode of operation can be initiated (FIG. 3). Here the measured voltage $U_{DC}$ at the point of intersection of $I_P$ and $U_{DC}$ is greater than the test voltage $U_P$. Accordingly the achieved operating point can deliver a higher power than the test operating point AP. If the measured voltage drops below the test voltage $U_P$, i.e. if no operating point can be set with the current $I_P$, the switching device 4 is not activated, as can be seen from FIG. 4, and no feed-in mode of operation can be initiated. The test procedure is repeated after a defined time.

The duration for the test procedure is usually within a range of a few seconds, and is essentially matched also to the capacity of the intermediate circuit 7, which stores the energy during the test procedure.

The first variant of the method in accordance with FIGS. 2 to 4 can advantageously be deployed in the case of inverters 3 with DC/DC-converters 6.

Figure 5:
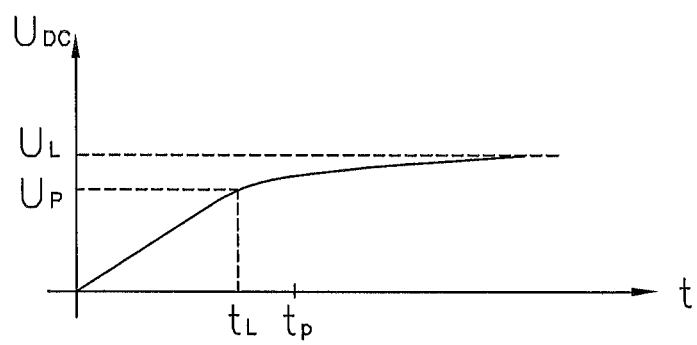
FIGS. 5 and 6 show voltage/time diagrams to illustrate a second inventive method.
Figure 6:
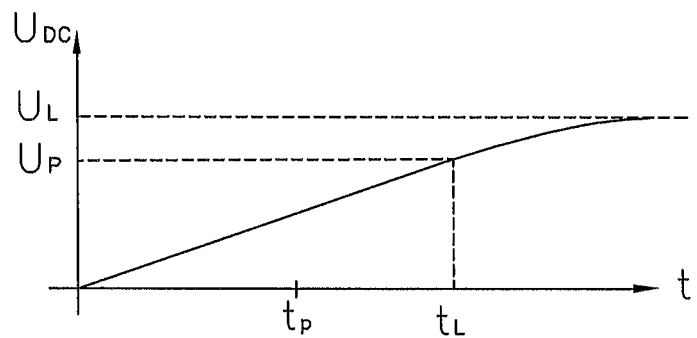

With the aid of FIGS. 5 and 6 a further method is now described for feeding energy from photovoltaic modules 2 into a supply grid 5 or to a load. Here the input power $P_e$ of the photovoltaic modules 2 is determined, in that during the test procedure the capacitor $C_{ZW}$ of the intermediate circuit 7 of the inverter 3 is charged with the energy from the photovoltaic modules 2, and with a test procedure the time $t_L$ required to achieve a specified fraction $U_P$ (e.g. 80%) of the open circuit voltage $U_L$ of the photovoltaic modules 2 is measured. The switching device 4 of the inverter 3 is activated and the feed-in mode of operation is initiated, if the test time $t_L$ is less than or equal to a specified critical time $t_P$. The switching device 4 of the inverter 3 is not activated and the feed-in mode of operation is not initiated, if the test time $t_L$ is greater than the specified critical time $t_P$.

In this variant of the method the intermediate circuit 7 is firstly discharged; this can take place via the DC/AC-converter 8, or via discharge resistances (not represented). The capacitor $C_{ZW}$ of the intermediate circuit 7 is then charged by means of the energy from the photovoltaic modules 2, and the voltage $U_{DC}$ is recorded as a function of the time t. The capacitor $C_{ZW}$ of the intermediate circuit 7 is charged if the open circuit voltage $U_L$ of the photovoltaic modules 2 has been achieved. For the activation of the switching device 4 it is sufficient for the test voltage $U_P$, which is, for example, 80% of the open circuit voltage $U_L$, to be achieved within a test time $t_L$, which lies below a specified critical time $t_P$.

In accordance with FIG. 5 the test voltage $U_P$ is achieved in a time $t_L$, which lies below the specified critical time $t_P$, as a result of which the photovoltaic modules 2 deliver sufficient input power $P_e$ and the switching device 4 can be activated, and the feed-in mode of operation can be initiated.

In accordance with FIG. 6 the test voltage $U_P$ is achieved in a time $t_L$, which lies above the specified critical time $t_P$, as a result of which the photovoltaic modules 2 do not deliver sufficient input power $P_e$, and the switching device 4 is not activated, and the feed-in mode of operation cannot be undertaken.

In this second variant of the method the test procedure is again executed by the control device 9 of the inverter 3, as a result of which no alterations to the hardware are necessary.

Thus, although at least one embodiment of the present invention has been shown and described, it is to be understood that many changes and modifications may be made thereunto without departing from the spirit and scope of the invention.

What is claimed is:

1. A method for feeding energy from photovoltaic modules (2) of a photovoltaic system (1) into a supply grid (5) or to a load, wherein a DC voltage (UDC) generated by the photovoltaic modules (2) is converted in an inverter (3) with an intermediate circuit (7) with a capacitor (CZW) and with a DC/AC-converter (8) into an AC voltage (UAC), and in a feed-in mode of operation the inverter (3) is connected via a switching device (4) to the supply grid (5), or to the load, wherein before the connection of the inverter (3) into the supply grid (5) or the load an input power (Pe) of the photovoltaic modules (2) is determined in a test procedure, and the switching device (4) of the inverter (3) is activated if the input power (Pe) of the photovoltaic modules (2) as determined is greater than or equal to a specified minimum input power (Pe,min),
wherein the input power (Pe) of the photovoltaic modules (2) is determined, wherein an open circuit voltage (UL) of the photovoltaic modules (2) is measured and from this value a test operating point (AP) with a test voltage (UP) and a test current (IP) is calculated, and with a test procedure a DC/DC converter (6) of the inverter is controlled to the test current (IP), and the DC voltage (UDC) of the photovoltaic modules (2) is measured, and the switching device (4) of the inverter is then activated if the DC voltage (UDC) of the photovoltaic modules (2) is greater than or equal to the test voltage (UP), wherein during the test procedure the energy from the photovoltaic modules (2) is stored in the capacitor (CZW) of the intermediate circuit (7).

2. The method according to claim 1, wherein the test current (IP) of the test operating point (AP) is determined by the division of the specified minimum input power (Pe,min) by the open circuit voltage (UL) reduced by a factor (k).

3. The method according to claim 2, wherein the factor (k) is between 70% and 90%.

4. The method according to claim 1, wherein before the test procedure the capacitor (CZW) of the intermediate circuit (7) of the inverter (3) is discharged.

5. The method according to claim 4, wherein the capacitor (CZW) of the intermediate circuit (7) of the inverter (3) is discharged via the DC/AC-converter (8) of the inverter (3).

6. The method according to claim 4, wherein the capacitor (CZW) of the intermediate circuit (7) of the inverter (3) is discharged via discharge resistances, or by means of a self-discharge of the capacitor (CZW).

7. The method according to claim 1, wherein the test procedure is executed cyclically, until the switching device (4) of the inverter (3) is activated and the feed-in mode of operation is executed.

8. The inverter (3) for converting the DC voltage (UDC) generated by the photovoltaic modules (2) into the AC voltage (UAC) for feeding the latter into the supply grid (5), or to the load, with a control device (9), the intermediate circuit (7) with the capacitor (CZW), the DC/AC-converter (8), and the switching device (4) for connecting an output to the supply grid (5), or to the load, in the feed-in mode of operation, wherein the control device (9) is designed for executing the method according to claim 1.

* * * * *